(12) United States Patent
Doi

(10) Patent No.: US 6,988,795 B2
(45) Date of Patent: Jan. 24, 2006

(54) INKJET INK AND INKJET RECORDING METHOD

(75) Inventor: Takatsugu Doi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 31 days.

(21) Appl. No.: 10/617,733

(22) Filed: Jul. 14, 2003

(65) Prior Publication Data

US 2004/0114013 A1 Jun. 17, 2004

(30) Foreign Application Priority Data

Dec. 11, 2002 (JP) ............................. 2002-359184

(51) Int. Cl.
*B41J 2/01* (2006.01)
(52) U.S. Cl. .................... 347/100; 347/95; 106/31.6
(58) Field of Classification Search ................ 428/195, 428/32.1; 347/105, 100, 96, 95, 101; 523/160; 106/31.6, 31.27, 31.13
See application file for complete search history.

(56) References Cited

U.S. PATENT DOCUMENTS

| | | | | |
|---|---|---|---|---|
| 4,740,420 A | * | 4/1988 | Akutsu et al. | 347/105 |
| 5,439,514 A | * | 8/1995 | Kashiwazaki et al. | 347/100 |
| 6,153,001 A | * | 11/2000 | Suzuki et al. | 106/31.65 |
| 6,368,397 B1 | * | 4/2002 | Ichizawa et al. | 106/31.65 |
| 6,378,999 B1 | * | 4/2002 | Doi et al. | 347/100 |

FOREIGN PATENT DOCUMENTS

| | | | |
|---|---|---|---|
| EP | 1013728 A1 | * | 6/2000 |
| JP | 5-17714 | | 1/1993 |
| JP | 5-202328 | | 8/1993 |
| JP | 11-228898 | | 8/1999 |

* cited by examiner

*Primary Examiner*—Manish S. Shah
(74) *Attorney, Agent, or Firm*—Morgan, Lewis & Bockius LLP

(57) ABSTRACT

The present invention relates to a kind of ink containing at least a pigment, first to third water-soluble solvent groups and water, wherein the first water-soluble solvent group contains one or more kind(s) water-soluble solvent having a solubility parameter $SP_1$, the second water-soluble solvent group contains one or more kind(s) of water-soluble solvents having a solubility parameter which is at least 1 greater than $SP_1$, and the third water-soluble solvent group contains one or more kind(s) of water-soluble solvents having a solubility parameter which is at least 1 less than $SP_1$.

21 Claims, No Drawings

INKJET INK AND INKJET RECORDING METHOD

CROSS-REFERENCE TO RELATED APPLICATION

This application claims priority under 35USC 119 from Japanese Patent Application No. 2002-359184, the disclosure of which is incorporated by reference herein.

BACKGROUND OF THE INVENTION

1. Field of the Invention

The present invention relates to inkjet ink and an inkjet recording method.

2. Description of the Related Art

So-called inkjet systems in which a liquid or melt solid ink is discharged through an ink discharge port such as a nozzle, a slit and a porous film are used in many printers due to their characteristics such as small size and low cost. Among these inkjet systems, a piezo-inkjet system for discharging ink utilizing deformation of a piezoelectric element and a thermal inkjet system utilizing the boiling of ink caused by the thermal energy are frequently utilized from the viewpoint of the high resolution and the high speed printability. In addition, an inkjet printer can print not only on a so-called paper such as a plain paper, a paper exclusively for inkjet but also on a film such as an OHP sheet, a cloth and the like.

For the purpose of the long-term storage stability, there is proposed use of a solvent represented by the following formula (II) as an organic solvent (for example, see Japanese Patent Application Laid-Open (JP-A) No. 05-17714). In order to secure the long-term storage stability, it is necessary to prevent water from evaporating. In the prior art, from such a viewpoint, a solvent represented by the general formula (II) has been used as a humectant. However, in a case of a kind of ink in which a pigment and a solvent represented by the general formula (II) are combined, reduction in the storage stability associated with aggregation of a pigment occurs in some cases.

  General formula (II)

[In the general formula (II), n represents an integer, and R represents hydrogen or an alkyl group.]

In addition, for the purpose of improving the long-term storage stability, the drying property in a plain paper, the printing quality, the water resistance and the abrasion resistance, there is provided a kind of ink for inkjet recording containing water, a pigment which is self-dispersible in water and a water-soluble organic solvent, and containing a water-soluble organic compound having the S.P. value of 12 or smaller and the surface tension at 25° C. less than 40 mN/m in an amount of 3.0% by mass to 15.0% by mass relative to a total mass of ink (JP-A No. 11-228898). Example of the same reference shows a kind of ink in which triethylene glycol is added as another additive, but it was found that when such the ink is stored for a longer period of time, the storage stability is insufficient.

In addition, there is provided an image forming method of using an ink composition containing a coloring material having at least one carboxyl group, and a multivalent metal salt solution, adding the multivalent metal salt solution to a recording material and, thereafter, printing using the ink composition (for example, see JP-A No. 05-202328). An object of this method is to improve the water resistance and color bleeding, but when a pigment is used as a coloring material, the long-term ejection stability is reduced in some cases.

As described above, according to the conventional methods, the long-term ejection stability, the long-term storage stability, the optical concentration, the bleeding and the water resistance can not be satisfied at the same time.

SUMMARY OF THE INVENTION

An object of the present invention is to solve the aforementioned problems. That is, an object of the invention is to provide a kind of inkjet ink and an inkjet recording method excellent in the long-term ejection stability, the long-term storage stability, the optical concentration, the bleeding and the water resistance.

In order to solve the problem of the invention, the present inventors intensively studied and, as a result, devised the invention explained below, which can satisfy the long-term ejection stability, the long-term storage stability, the optical concentration, the bleeding and the water resistance at the same time.

The first aspect of the invention is to provide an inkjet ink (J) comprising at least a pigment, a water-soluble solvent and water, the water-soluble solvent comprising:

a first water-soluble solvent group containing at least one kind of water-soluble solvent represented by the following general formula (I);

a second water-soluble solvent group containing at least one kind of water-soluble solvent having a solubility parameter which is at least 1 greater than a solubility parameter $SP_1$ of the at least one kind of water-soluble solvent represented by general formula (I), and;

a third water-soluble solvent group containing at least one kind of water-soluble solvent having a solubility parameter which is at least 1 less than the solubility parameter $SP_1$;

wherein respective contents (% by mass) of the water-soluble solvent groups contained in the inkjet ink satisfy the following equation (1) and the following equation (2):

| | |
|---|---|
| $HO-(CHR-CH_2-O-)_n-H$ | General formula (I) |
| $W_2/W_1 \geq 1.0$ | Equation (1) |
| $0.25 \leq W_3/W_1 \leq 0.75$ | Equation (2) | wherein in general formula (I), equation (1) and equation (2), n represents an integer of 3 to 6; R represents hydrogen or a methyl group; $W_1$ represents a content (% by mass) of the first water-soluble solvent group contained in the inkjet ink; $W_2$ represents a content (% by mass) of the second water-soluble solvent group contained in the inkjet ink; and $W_3$ represent a content (% by mass) of the third water-soluble solvent group contained in the inkjet ink.

The second aspect of the invention is to provide an inkjet ink (J), wherein the first water-soluble organic solvent group further contains a water-soluble solvent other than the at least one kind of water-soluble solvent represented by general formula (I), having a solubility parameter such that an absolute value of a difference thereof from the solubility parameter $SP_1$ is less than 1.

The third aspect of the invention is to provide an inkjet ink (J), wherein the pigment is self-dispersible in water.

The fourth aspect of the invention is to provide an inkjet ink (J), further containing a polymer anion or a polymer cation, wherein the pigment is self-dispersible in water.

The fifth aspect of the invention is to provide an inkjet ink (J), further comprising a polymer dispersant, wherein the pigment is dispersed by the polymer dispersant.

The sixth aspect of the invention is to provide an inkjet ink (J), wherein the first water-soluble organic solvent group further contains a water-soluble solvent other than the at least one kind of water-soluble solvent represented by general formula (I), having a solubility parameter such that an absolute value of a difference thereof from the solubility parameter $SP_1$ is less than 1, and an absolute value of a ζ potential of the inkjet ink is in the range of 3 mV to 60 mV.

The seventh aspect of the invention is to provide an inkjet ink (J), wherein a surface tension of the inkjet ink is at least 20 Nm/m and less than 45 mN/m.

The eighth aspect of the invention is to provide an inkjet ink (J), wherein a viscosity of the inkjet ink is at least 1.2 mPa·s and less than 6.0 mPa·s.

The nineth aspect of the invention is to provide an inkjet recording method (K) of printing on a recording medium containing a multivalent metal salt, an organic cationic substance or an organic anionic substance, using an inkjet ink containing at least a pigment, a water-soluble solvent and water, wherein:

the water-soluble solvent contains, a first water-soluble solvent group containing at least one kind of water-soluble solvent represented by the following general formula (I), a second water-soluble solvent group containing at least one kind of water-soluble solvent having a solubility parameter which is at least 1 greater than a solubility parameter $SP_1$ of the at least one kind of water-soluble solvent represented by general formula (I), and a third water-soluble solvent group containing at least one kind of water-soluble solvent having a solubility parameter which is at least 1 less than the solubility parameter $SP_1$; and respective contents (% by mass) of the water-soluble solvent groups contained in the inkjet ink satisfy the following equation (1) and the following equation (2):

$$\text{HO—(CHR—CH}_2\text{—O—)}_n\text{—H} \qquad \text{General formula (I)}$$

$$W_2/W_1 \geq 1.0 \qquad \text{Equation (1)}$$

$$0.25 \leq W_3/W_1 \leq 0.75 \qquad \text{Equation (2)}$$

wherein in general formula (I), equation (1) and equation (2), n represents an integer of 3 to 6; R represents hydrogen or a methyl group; $W_1$ represents a content (% by mass) of the first water-soluble solvent group contained in the inkjet ink; $W_2$ represents a content (% by mass) of the second water-soluble solvent group contained in the inkjet ink; and $W_3$ represents a content (% by mass) of the third water-soluble solvent group contained in the inkjet ink.

The tenth aspect of the invention is to provide an inkjet recording method (K), wherein the first water-soluble organic solvent group further contains a water-soluble solvent other than the at least one kind of water-soluble solvent represented by the general formula (I), having a solubility parameter such that an absolute value of a difference thereof from the solubility parameter $SP_1$ is less than 1.

The eleventh aspect of the invention is to provide an inkjet recording method (K), wherein a number of particles having particle diameters of 5 μm or larger contained in the inkjet ink which is added dropwise to a surface of the recording medium is $1\times10^2/\mu l$ or more.

The twelfth aspect of the invention is to provide an inkjet recording method (L) in which a liquid composition containing a multivalent metal salt, an organic cationic substance or an organic anionic substance is imparted to a surface of a recording medium and, thereafter, printing is conducted on a region of the surface of the recording medium to which the liquid composition has been imparted, using an inkjet ink containing at least a pigment, a water-soluble solvent and water, wherein:

the water-soluble solvent contains a first water-soluble solvent group containing at least one kind of water-soluble solvent represented by the following general formula (I), a second water-soluble solvent group containing at least one kind of water-soluble solvent having a solubility parameter which is at least 1 greater than a solubility parameter $SP_1$ of the at least one kind of water-soluble solvent represented by general formula (I), and a third water-soluble solvent group containing at least one kind of water-soluble solvent having a solubility parameter which is at least 1 less than the solubility parameter $SP_1$; and respective contents (% by mass) of the water-soluble solvent groups contained in the inkjet ink satisfy the following equation (1) and the following equation (2):

$$\text{HO—(CHR—CH}_2\text{—O—)}_n\text{—H} \qquad \text{General formula (I)}$$

$$W_2/W_1 \geq 1.0 \qquad \text{Equation (1)}$$

$$0.25 \leq W_3/W_1 \leq 0.75 \qquad \text{Equation (2)}$$

wherein in general formula (I), equation (1) and equation (2), n represents an integer of 3 to 6; R represents hydrogen or a methyl group; $W_1$ represents a content (% by mass) of the first water-soluble solvent group contained in the inkjet ink; $W_2$ represents a content (% by mass) of the second water-soluble solvent group contained in the inkjet ink; and $W_3$ represents a content (% by mass) of the third water-soluble solvent group contained in the inkjet ink.

The thirteenth aspect of the invention is to provide an inkjet recording method (L), wherein the first water-soluble organic solvent group further contains a water-soluble solvent other than the at least one kind of water-soluble solvent represented by the general formula (I), having a solubility parameter such that an absolute value of a difference thereof from the solubility parameter $SP_1$ is less than 1.

The fourteenth aspect of the invention is to provide an inkjet recording method (L), wherein a number of particles having particle diameters of 5 μm or larger in a mixed solution of the inkjet ink and the liquid composition is $1.0\times10^3/\mu l$ or more.

The fifteenth aspect of the invention is to provide an inkjet recording method (M) of printing on a recording medium by a thermal inkjet system or a piezo-inkjet system using an inkjet ink containing at least a pigment, a water-soluble solvent and water, wherein:

the water-soluble solvent contains a first water-soluble solvent group containing at least one kind of water-soluble solvent represented by the following general formula (I), a second water-soluble solvent group containing at least one kind of water-soluble solvent having a solubility parameter which is at least 1 greater than a solubility parameter $SP_1$ of the at least one kind of water-soluble solvent represented by general formula (I), and a third water-soluble solvent group containing at least one kind of water-soluble solvent having a solubility parameter which is at least 1 less than the solubility parameter $SP_1$; and respective contents (% by mass) of the water-soluble solvent groups contained in the inkjet ink satisfy the following equation (1) and the following equation (2):

$$HO—(CHR—CH_2—O—)_n—H \qquad \text{General formula (I)}$$

$$W_2/W_1 \geq 1.0 \qquad \text{Equation (1)}$$

$$0.25 \leq W_3/W_1 \leq 0.75 \qquad \text{Equation (2)}$$

wherein in general formula (I), equation (1) and equation (2), n represents an integer of 3 to 6; R represents hydrogen or a methyl group; $W_1$ represents a content (% by mass) of the first water-soluble solvent group contained in the inkjet ink; $W_2$ represents a content (% by mass) of the second water-soluble solvent group contained in the inkjet ink; and $W_3$ represents a content (% by mass) of the third water-soluble solvent group contained in the inkjet ink.

The sixteenth aspect of the invention is to provide an inkjet recording method (M), wherein the first water-soluble organic solvent group contains a water-soluble solvent other than the at least one kind of water-soluble solvent represented by general formula (I), having a solubility parameter such that an absolute value of a difference thereof from the solubility parameter $SP_1$ is less than 1.

The seventeenth aspect of the invention is to provide an inkjet recording method (M), wherein an amount of the inkjet ink to be imparted to a surface of the recording medium is 25 ng or less per one droplet.

DETAILED DESCRIPTION OF THE INVENTION

The present invention will be explained separately and sequentially for inkjet ink and an inkjet recording method.

(Inkjet Ink)

The inkjet ink of the invention (hereinafter, abbreviated as "ink" in some cases) is a kind of inkjet ink containing at least a pigment, a water-soluble solvent and water, characterized in that the water-soluble solvent contains a first water-soluble solvent group containing at least one kind water-soluble solvents represented by the following general formula (I), a second water-soluble solvent group containing one or more kind(s) of water-soluble solvents having a solubility parameter which is at least 1 greater than a solubility parameter $SP_1$ of a water-soluble solvent represented by the general formula (I), and a third water-soluble solvent group containing one or more kind(s) of water-soluble solvents having a solubility parameter which is at least 1 less than the solubility parameter $SP_1$, and the content (% by mass) of each water-soluble solvent group contained in the inkjet ink satisfies the relationship of the following equation (1) and the following equation (2).

$$HO—(CHR—CH_2—O—)_n—H \qquad \text{General formula (I)}$$

$$W_2/W_1 \geq 1.0 \qquad \text{Equation (1)}$$

$$0.25 \leq W_3/W_1 \leq 0.75 \qquad \text{Equation (2)}$$

In the general formula (I), the equation (1) and the equation (2), n represents an integer of 3 to 6, R represents hydrogen or a methyl group, $W_1$ represents the content (% by mass) of a first water-soluble solvent group contained in the inkjet ink, $W_2$ represents the content (% by mass) of a second water-soluble solvent group contained in the inkjet ink, and $W_3$ represents the content (% by mass) of a third water-soluble solvent group contained in the inkjet ink.

When a first water-soluble solvent group contains two or more kinds of water-soluble solvents represented by the general formula (I), a solubility parameter $SP_1$ of the first water-soluble solvent group means a value obtained by calculating solubility parameters of water-soluble solvents represented by the respective formulae (I), taking an average weighted by the content (% by mass) into consideration, as shown by the following equation (3).

$$SP_1 = \frac{\sum (SP(n) \times W(n))}{\sum W(n)} \qquad \text{Equation (3)}$$

In the equation (3), SP(n) represents a solubility parameter of a $n^{th}$ water-soluble solvent represented by the general formula (I), W(n) represents the content (% by mass) of a $n^{th}$ water-soluble solvent represented by the general formula (I), and n represents an integer of 1 or larger.

Since the ink of the invention has the above-explained features and satisfies the equations (1) and (2) at the same time, it is excellent in the long-term ejection stability, the long-term storage stability, the optical concentration, the bleeding and the water resistance. When three or more kinds of water-soluble solvents contained in ink can not satisfy any of the equation (1) and the equation (2), all of the long-term ejection stability, the long-term storage stability, the optical concentration, the bleeding and the water resistance can not be satisfied simultaneously at a high level.

The mechanism of exerting such the effect has not been made clear, but the present inventor presume as follows:

First, the present inventors intensively have studied a water-soluble solvent represented by the general formula (I) used in the ink of the invention and found that, when this water-soluble solvent is added to the ink, assuming a combination with a pigment, Drop speed is improved and Kogation (phenomenon in which as the number of pulses applied to a printing head increases, the ink components are adhered on a heater provided on the printing head when printing is performed using a thermal inkjet system) is prevented.

On the other hand, one cause of Kogation is contemplated to be denaturation of ink components by the thermal stress of a heater. There is a tendency that, by occurrence of this Kogation, the discharging property of ink is reduced, the optical concentration is reduced, and the ejection directing property is deteriorated and, as a result, the long-term ejection stability is reduced.

However, from the above results, the present inventors presume that addition of a water-soluble solvent represented by the general formula (I) to ink increases Drop speed and improves the ejection property of the ink, whereby, deterioration of the long-term ejection stability caused by Kogation is prevented. In addition, such the prevention of deterioration of the long-term ejection stability is presumed to be due to some influence of a water-soluble solvent represented by the general formula (I) on the occurrence of air bubbles upon heating of ink with a heater.

Although a water-soluble solvent represented by the general formula (I) has been used also in the conventional ink, such the water-soluble solvent has been utilized as a humectant for preventing water in ink from evaporating to improve the storage stability. However, the present inventors intensively have studied and found that, even when the water-soluble solvent represented by the general formula (I) is added to ink, the storage stability is reduced in some cases when the ink is stored over a longer period of time. Reduction in such the long-term storage stability is presumed to be caused by that the water-soluble solvent represented by the formula (I) interacts with a coloring material to destabilize dispersion of this coloring material. Such presumption is supported by an increase in a particle diameter of a coloring material contained in ink during storage.

The present inventors found that it is effective to use a kind of ink prepared by combining a first water-soluble solvent group containing a water-soluble solvent represented by the general formula (I) with second and third water-soluble solvent groups so that these water-soluble solvents satisfy the relationship of the aforementioned equations (1) and (2), in order to solve the aforementioned problems. Further, the present inventors found that, in such the case, in addition to being excellent also in the long-term storage stability without deteriorating the long-term ejection stability, the optical concentration, the bleeding and the water resistance can be satisfied at a high level.

Although the mechanism by which the long-term storage stability is also excellent without deteriorating the long-term ejection stability like this has not been made clear, the following two points are presumed to contribute thereto: (1) by adding to ink a third water-soluble solvent group which is more hydrophobic than a first water-soluble solvent group, the solubility of the first water-soluble solvent group in the ink is improved, and interaction between a pigment and the first water-soluble solvent group is reduced, and (2) by adding to ink a second water-soluble solvent group which is more hydrophilic than the first water-soluble solvent group, the moisture retention of the ink is secured to suppress excessive evaporation of water.

As described above, when three kinds of water-soluble solvent groups contained in the ink of the invention can not satisfy any of the aforementioned equations (1) and (2), the ink of the invention can not satisfy all of the long-term ejection stability, the long-term storage stability, the optical concentration, the bleeding and the resistance to a water simultaneously at high level. In this case, although it is difficult to say that there is the clear corresponding relationship between the equations (1) and (2) and these properties, there is the following tendency.

First, when a value of $W_2/W_1$ is less than 1, there is a tendency that the long-term storage property is deteriorated by water evaporation.

In addition, when a value of $W_3/W_1$ is less than 0.25, there is a tendency that the long-term storage property is deteriorated due to increase in a particle diameter of coloring material in an ink (presumed to be due to destabilization of the dispersed state and aggregation). Further, when a value of $W_3/W_1$ exceeds 0.75, there is a tendency that the solubility of the first water-soluble solvent group in the ink is enhanced, and the long-term ejection stability is reduced.

In the equation (1), a value of $W_2/W_1$ is preferably 1.5 or larger, further preferably 2 or more. In addition, in the equation (2), a value of $W_3/W_1$ is preferably 0.3 to 0.7, more preferably 0.4 to 0.6.

In the invention, a solubility parameter (SP value) means a value defined by the following equation (4). The SP value can be obtained by utilizing the chemical composition, the evaporation heat, the refractive index, the kauri butanol value, the surface tension and the like, but in the invention, the SP value of Fedors calculated from chemical composition is used.

Equation (4)

$$SP = \sqrt{\frac{\Delta E}{V}} = \sqrt{\frac{\sum_i \Delta ei}{\sum_i \Delta vi}}$$

Equation (4)

In the equation (4), SP represents a solubility parameter, $\Delta E$ represents the cohesive energy (cal/mol), V represents molar volume (cm$^3$/mol), $\Delta ei$ represents the evaporation energy (cal/atom or group of atoms) of $i^{th}$ atom or group of atoms, $\Delta vi$ represents a molar volume (cm$^3$/atom or group of atoms) of $i^{th}$ atom or group of atoms, and i represents an integer of 1 or larger.

Customarily the SP value represented by the equation (4) is obtained so that its unit is cal$^{1/2}$/cm$^{3/2}$, and the value is expressed as a dimensionless value. Additionally, in the invention, since a relative reference of the SP value between two compounds has the significance, the value obtained according to the above custom is used, and the value is expressed as a dimensionless value.

For reference, when the SP value represented by the equation (4) can be converted into SI unit (J$^{1/2}$/m$^{3/2}$), by being multiplied by 2046.

The ink of the invention has, as explained above, the characteristics in the kinds of water-soluble solvents contained in the ink and their solubility parameters and contents, and desirable physical properties other than them will be explained below.

The absolute value of the ζ potential of a coloring material such as a pigment and the like contained in the ink of the invention is preferably 3 mV to 60 mV, more preferably 5 mV to 40 mV, further preferably 7.5 mV to 30 mV. When the absolute value of the ζ potential is less than 5 mV, the long-term storage stability can not be maintained in some cases. On the other hand, when the absolute value of the ζ potential exceeds 60 mV, the redispersibility of the coloring material in water becomes high, and the water resistance is deteriorated in some cases.

The surface tension of the ink of the invention is preferably at least 20 mN/m and less than 45 mN/m, more preferably at least 25 mN/m and less than 40 mN/m, where further preferably at least 27.5 mN/m and less than 37.5 mN/m.

When the surface tension of the ink is less than 20 mN/m, the ink permeates into the recording medium faster, and the color unevenness due to printing sequence, the optical concentration and the bleeding are deteriorated in some cases. Conversely, when the tension exceeds 40 mN/m, the ink permeates into the recording medium slower, and the ink concentration at a solid part some times becomes uneven.

The viscosity of the ink of the invention is preferably at least 1.2 mPa·s and less than 6.0 mPa·s, more preferably at least 1.5 mPa·s and less than 4.5 mPa·s, further preferably at least 1.8 mPa·s and less than 4.0 mPa·s.

When the viscosity of the ink is greater than 6.0 mPa·s, the discharging property of the ink is reduced, and the reliability is reduced in some cases.

On the other hand, when the viscosity of the ink is less than 1.2 mPa·s, the sufficient optical concentration can not be obtained in some cases, which is thought to be caused by the phenomenon that the permeability of the ink into a recording medium becomes great, and a pigment is permeated into the interior of a recording medium.

Then, components (pigment, water-soluble solvent, other additives) of the ink of the invention will be explained in detail.

As a pigment used in the invention, organic pigments or inorganic pigments may be used, and examples of black pigments include carbon black pigments such as furnace black, lamp black, acetylene black, channel black and the like. In addition to pigments of black and three primary colors, that is cyan, magenta, and yellow, pigments of specific colors such as red, green, blue, brown, white and the like, metal luster pigments such as gold, silver and the like, colorless or pale color extender pigments, plastic pigments and the like may be used. In addition, pigments which are newly synthesized for the invention may be used.

Examples include Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080, Raven 1060 (all manufactured by Columbian Chemicals Company), Regal 400R, Regal 330R, Regal 660R, Mogul L, Black Pearls L, Monarch 700, Monarch 800, Monarch 880, Monarch 900, Monarch 1000, Monarch 1100, Monarch 1300, Monarch 1400 (all manufactured by Cabot Corporation), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, Special Black 4(all manufactured by Degussa), No. 25, No. 33, No. 40, No. 47, No. 52, No. 900, No. 2300, MCF-88, MA600, MA7, MA8, MA100 (all manufactured by Mitsubishi Chemical Co., Ltd.) and the like. However examples are not limited to the above.

Examples of cyan include C.I. Pigment Blue-1, C.I. Pigment Blue-2, C.I. Pigment Blue-3, C.I. Pigment Blue-15, C.I. Pigment Blue-15:1, C.I. Pigment Blue-15:2, C.I. Pigment Blue-15:3, C.I. Pigment Blue-15:4, C.I. Pigment Blue: 16, C.I. Pigment Blue-22, C.I. Pigment Blue-60 and the like. However examples are not limited to the above.

Examples of magenta include C.I. Pigment Red-5, C.I. Pigment Red-7, C.I. Pigment Red-12, C.I. Pigment Red-48, C.I. Pigment Red-48:1, C.I. Pigment Red-57, C.I. Pigment Red-112, C.I. Pigment Red-122, C.I. Pigment Red-123, C.I. Pigment Red-146, C.I. Pigment Red-168, C.I. Pigment Red-184, C.I. Pigment Red-202 and the like. However examples are not limited to the above.

Examples of yellow include C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-138, C.I. Pigment Yellow-151, C.I. Pigment Yellow-154 and the like. However examples are not limited to the above.

Alternatively, as a pigment used in the invention, a pigment which is self-dispersible in water may be used. A pigment which is self-dispersible in water refers to a pigment which has many solubilizing groups for water on its surface, and is stably dispersed in water in the absense of a polymer dispersant.

Specifically, a pigment which is self-dispersible in water is obtained by subjecting a general pigment to surface modifying treatment such as acid or base treatment, coupling agent treatment, polymer graft treatment, plasma treatment, oxidation/reduction treatment and the like.

Alternatively, as a pigment which is self-dispersible in water, in addition to pigments obtained by subjecting the aforementioned pigment to surface modifying treatment, commercially available self-dispersible pigments such as Cab-o-jet-200, Cab-o-jet-250, Cab-o-jet-260, Cab-o-jet-270, Cab-o-jet-300, IJX-444 and IJX-55 manufactured by Cabot Corporation, and Microjet Black CW-1 and Microjet Black CW-2 and the like manufactured by Orient Chemical Industries, Ltd. may be used.

Also when a pigment which is self-dispersible in water is used as a pigment, an ink may contain a polymer anion or a polymer cation.

The content of a pigment contained in an ink is preferably in the range of 0.5 to 20% by mass, more preferably in the range of 1 to 10% by mass. When the content of a pigment in an ink is less than 0.5% by mass, the sufficient optical concentration is not obtained in some cases. When the content is more than 20% by mass, the ejection property of an ink becomes unstable in some cases.

The following polymer compounds may be added to the ink of the invention. These polymer compounds may be used as a pigment dispersant for dispersing a normal pigment, or alternatively, they may be used as an additive when a pigment which is self-dispersible in water is used as a pigment.

As a polymer compound, nonionic compounds, anionic compounds, cationic compounds, amphoteric compounds and the like can be used. For example, a copolymer of a monomer having an $\alpha$, $\beta$-ethylenic unsaturated group can be used.

Examples of a monomer having an $\alpha$, $\beta$-ethylenic unsaturated group include acrylic acid, methacrylic acid, crotonic acid, itaconic acid, itaconic acid monoester, maleic acid, maleic acid monoester, fumaric acid, fumaric acid monoester, vinylsulfonic acid, styrenesulfonic acid, sulfonated vinylnaphthlene, vinylalcohol, acrylamide, methacryloxyethyl phosphate, bismethacryloxyethyl phosphate, methacryloxyethylphenylacid phosphate, ethylene glycol dimethacrylate, diethylene glycol dimethacrylate, styrene, styrene derivatives such as $\alpha$-methylstyrene, vinyltoluene and the like, vinylcyclohexane, vinylnaphthalene, vinylnaphthalene derivatives, acrylic acid alkyl ester, acrylic acid phenyl ester, methacrylic acid alkyl ester, methacrylic acid phenyl ester, methacrylic acid cycloalkyl ester, crotonic acid alkyl ester, itaconic acid dialkyl ester, maleic acid dialkyl ester and the like.

A copolymer obtained by copolymerizing one or more kind(s) of monomer having an $\alpha$, $\beta$-ethylenic unsaturated group alone or a plurality of the polymers can be used as a polymer dispersant. Examples thereof include polyvinyl alcohol, polyvinylpyrrolidone, styrene-styrenesulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, acrylic acid alkyl ester-acrylic acid copolymer, methacrylic acid alkyl ester-methacrylic acid, styrene-methacrylic acid alkyl ester-methacrylic acid copolymer, styrene-acrylic acid alkyl ester-acrylic acid copolymer, styrene-methacrylic acid phenyl ester-methacrylic acid copolymer, styrene-methacrylic acid cyclohexyl ester-methacrylic acid copolymer and the like.

It is preferable that the above-exemplified polymer compounds which are added to an ink have a mass average molecular weight in the range of 2000 to 15000. When a molecular weight of a polymer substance is less than 2000, the pigment dipersibility is reduced in some cases. On the other hand, when a molecular weight exceeds 15000, the viscosity of the ink is increased, and the discharging property is deteriorated in some cases. A more preferable mass average molecular weight of a polymer compound is in the range of 3500 to 10000.

When a polymer compound is added to an ink, it is preferable that an addition amount is in the range of 0.1 to 3% by mass. When an addition amount exceeds 3% by mass, the viscosity of the ink is increased, and the ejection property of the ink becomes unstable in some cases. On the other hand, when an addition amount is less than 0.1% by mass, the dispersion stability of a pigment is decreased in some cases. An amount of a polymer compound to be added to the ink is more preferably in the range of 0.15 to 2.5% by mass, further preferably in the range of 0.2 to 2% by mass.

As a water-soluble organic solvent used in the invention, the known water-soluble solvents such as polyhydric alcohols, polyhydric alcohol derivatives, nitrogen-containing solvents, alcohols, sulfur-containing solvents and the like can be used.

Examples of polyhydric alcohols include ethylene glycol, diethylene glycol, propylene glycol, butylene glycol, triethylene glycol, tetraethylene glycol, pentaethylene glycol, hexaethylene glycol, tripropylene glycol, 1,5-pentanediol, 1,2,6-hexanetriol, glycerin and the like.

Examples of polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, ethylene oxide adduct of diglycerin, and the like.

Examples of a nitrogen-containing solvent include pyrrolidone, N-methyl-2-pyrrolidone, cyclohexylpyrrolidone, triethanolamine and the like, examples of alcohols include alcohols such as ethanol, isopropyl alcohol, butyl alcohol, benzyl alcohol and the like, and examples of sulfur-containing solvents include thiodiethanol, thiodiglycerol, sulfolane, dimethyl sulfoxide and the like. Besides, propylene carbonate, ethylene carbonate, and the like may be used.

For the first water-soluble solvent group, it is required that the water-soluble solvent represented by the general formula (I) is used. Specifically, one kind selected from the group of triethylene glycol, tetraethylene glycol, pentaethylene glycol, hexaethylene glycol and tripropylene glycol, or a combination of two or more of them can be used.

When the first water-soluble solvent group contains two or more kinds of water-soluble solvents represented by the general formula (I), a solubility parameter $SP_1$ of the first water-soluble solvent group is calculated according to the already described equation (3).

In addition, the first water-soluble solvent group may contain one or more kind(s) of water-soluble solvents other than the general formula (I). A water-soluble solvent other than the general formula (I) contained in the first water-soluble solvent group (hereinafter, abbreviated as "water-soluble solvent other than the general formula (I)" in some cases) means a water-soluble solvent having a solubility parameter such that an absolute value of a difference between its solubility parameter and solubility parameter $SP_1$ (in the case of two or more kinds, a value obtained based on the equation (3)) of one or more kind(s) of water-soluble solvents represented by the general formula (I) is less than 1.

When a water-soluble solvent other than the general formula (I) is contained in the first water-soluble solvent group in addition to one kind water-soluble solvent represented by the general formula (I), a combination of them is not particularly limited as far as the solubility parameters satisfy the aforementioned conditions, but examples thereof include the following combinations.

When triethylene glycol is used as the water-soluble solvent represented by the general formula (I), one or more kind(s) of 1,2-hexanediol, polyvinylpyrrolidone and ethylene oxide adduct of diglycerin can be used by combination as the water-soluble solvent other than the general formula (I). When tetraethylene glycol is used as the water-soluble solvent represented by the general formula (I), one or more kind(s) of 1,2-hexanediol, ethylene oxide adduct of diglycerin, polyvinylpyrrolidone, 2-pyrrolidone and ethylene glycol monomethyl ether can be used by combination as the water-soluble solvent other than the general formula (I). When pentaethylene glycol is used as the water-soluble solvent represented by the general formula (I), one or more kind(s) of diethylene glycol monomethyl ether, propylene glycol monomethyl ether, ethylene glycol monoethyl ether, polyvinylpyrrolidone, ethylene oxide adduct of diglycerin, ethylene glycol monomethyl ether and 2-pyrrolidone can be used by combination as the water-soluble solvent other than the general formula (I).

In addition, when hexaethylene glycol is used as the water-soluble solvent represented by the general formula (I), one or more kind(s) of polyvinylpyrrolidone, 2-pyrrolidone, ethylene glycol monomethyl ether, ethylene oxide adduct of diglycerine, ethylene glycol monoethyl ether, propylene glycol monomethyl ether, diethylene glycol monomethyl ether, propylene glycol monomethyl ether and diethylene glycol monoethyl ether can be used by combination as the water-soluble solvent other than the general formula (I). When tripropylene glycol is used as the water-soluble solvent represented by the general formula (I), one or more kind(s) of diethylene glycol monomethyl ether, propylene glycol monomethyl ether, ethylene glycol monoethyl ether, ethylene oxide adduct of diglycerin, ethylene glycol monomethyl ether, polyvinylpyrrolidone and 2-pyrrolidone can be used by combination as the water-soluble solvent other than the general formula (I).

In the case two or more kinds of water-soluble solvents represented by the general formula (I) are used, one or more kind(s) of the water-soluble solvents other than the general formula (I) (e.g. the above-exemplified water-soluble solvents other than the general formulae (I)) having a solubility parameter is/are selected, and can be used by combination, such that an absolute value of a difference between its solubility parameter and a solubility parameter $SP_1$ of water-soluble solvents represented by the general formula (I) calculated according to the already described equation (3) is less than 1.

In addition, the second water-soluble solvent group is not particularly limited as far as it is a water-soluble solvent having a solubility parameter which is at least 1 greater than a solubility parameter $SP_1$ of the first water-soluble solvent group. For example, it is preferable to select and use solvents satisfying the aforementioned relationship among the group consisting of ethylene glycol, diethylene glycol, propylene glycol, glycerin, ethanol and isopropyl alcohol, and a plurality of such solvents may be used.

Similarly, the third water-soluble solvent group is not particularly limited as far as it is a water-soluble solvent having a solubility parameter which is at least 1 less than a solubility parameter $SP_1$ of the first water-soluble solvent group. For example, it is preferable to select and use solvents satisfying the aforementioned relationship among the group consisting of ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, ethylene oxide adduct of diglycerin, pyrrolidone, N-methyl-2-pyrrolidone, cyclohexylpyrrolidone and sulfolane, and a plurality of them may be used.

The content of all water-soluble organic solvents contained in the ink is preferably in the range of 1 to 60% by mass, more preferably in the range of 5 to 40% by mass.

When the content of all water-soluble organic solvents contained in the ink is less than 1% by mass, the sufficient optical concentration is not obtained in some cases. Conversely, when the content is greater than 60% by mass, the viscosity of the ink is increased, and the ejection property of the ink becomes unstable in some cases.

A surfactant may be added to the ink of the invention if necessary. As this surfactant, a compound having a structure having both of a hydrophilic part and a hydrophobic part in a molecule can be used. Any of an anionic surfactant, a cationic surfactant, an amphoteric surfactant and a nonionic surfactant may be used. Alternatively, the already described polymer compound (polymer dispersant) may be used also as a surfactant.

As the anionic surfactant, alkylbenzenesulfonate, alkylphenylsulfonate, alkylnaphtharene sulfonate, higher fatty acid salt, sulfate ester salt of higher fatty acid ester, sulfonate salt of higher fatty acid ester, sulfate ester salt and sulfonate salt of higher alcohol ether, higher alkyl sulfosuccinate salt, higher alkyl phosphate ester salt, phosphate ester salt of ethylene oxide adduct of higher alcohol and the like can be used. For example, dodecylbenzenesulfonate, kerylbenzenesulfonate, isopropylnaphthalenesulfonate, monobutylphenylphenolmonosulfonate, monobutylbiphenylsulfonate, dibutylphenylphenoldisulfonate and the like may be also effectively used.

Examples of the nonionic surfactant include ethylene oxide adduct of polypropylene glycol, polyoxyethylene nonylphenylether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylolamide, acetylene glycol, oxyethylene adduct of acetylene glycol, aliphatic alkanolamide, glycerin ester, sorbitan ester and the like.

Examples of the cationic surfactant include tetraalkylammonium salt, alkylamine salt, benzalkonium salt, alkylpyridium salt, imidazolium salt and the like. More specific examples include dihydroxyethylstearylamine, 2-heptadecenyl-hydroxyethylimidazoline, lauryldimethylbenzylammonium chloride, cetylpyridinium chloride, stearamidomethylpyridinium chloride and the like.

Besides, silicone type surfactants such as oxyethylene adduct of polysiloxane and the like, fluorine type surfactants such as perfluoroalkylcarboxylate, perfluoroalkylsulfonate, oxyethylene perfluoroalkyl ether and the like, and biosurfactants such as spicrysporic acid, rhamnolipid, lysolecithin and the like may be used.

Among the above-exemplified surfactants, nonionic surfactants are preferable from the viewpoint of the dispersion stability of a pigment. In addition, from the viewpoint of control of the permeability, acetylene glycol, oxyethylene adduct of acetylene glycol, polyoxyethylene alkyl ether and the like are particularly preferable.

An amount of the surfactant to be added to the ink is preferably less than 10% by mass, more preferably in the range of 0.01 to 5% by mass, further preferably in the range of 0.01 to 3% by mass. When an addition amount is more than 10% by mass, the optical concentration and the storage stability of the ink are deteriorated in some cases.

Further, in the ink of the invention, for the purpose of controlling the properties, for example, improving the ink discharging property, polyethyleneimine, polyamines, polyvinylpyrrolidone, polyethylene glycol, cellulose derivatives such as ethylcellulose, carboxymethylcellulose and the like, polysaccharides and derivatives thereof, other water-soluble polymers, polymer emulsions such as acrylic polymer emulsion, polyurethane emulsion and the like, cyclodextrin, macrocyclic amines, dendrimer, crown ethers, urea and derivatives thereof, acetamide and the like can be used.

In addition, in order to adjust the conductivity or a pH, alkali metal compounds such as potassium hydroxide, sodium hydroxide, lithium hydroxide and the like, nitrogen-containing compounds such as ammonium hydroxide, triethanolamine, diethanolamine, ethanolamine, 2-amino-2-methyl-1-propanol and the like, alkaline earth metal compounds such as calcium hydroxide and the like, acids such as sulfuric acid, hydrochloric acid, nitric acid and the like, and salts of strong acids and weak alkalis such as ammonium sulfate can be used.

Besides, if necessary, a pH buffering agent, an antioxidant, a mildewproofing agent, a viscosity modifier, an electroconductive agent, an ultraviolet ray absorbing agent and a chelating agent may be added.

(Inkjet Recording Method)

Then, the inkjet recording method of the invention will be explained. The inkjet recording method of the invention is not particularly limited as far as the method is a method for printing on a recording medium using the ink of the invention, but specifically, the following method is preferable.

In the inkjet recording method of the invention, it is suitable to use a recording medium containing a multivalent metal salt, an organic cationic substance or an organic anionic substance as a recording medium used in printing.

By using such the recording medium in combination with the ink of the invention, it becomes possible to rapidly aggregate a coloring material such as a pigment and the like contained in the ink on the recording medium, and it becomes possible to further improve the image quality such as the optical concentration, the bleeding and the like.

The number of particles having a particle diameter of 5 $\mu$m or larger contained in the ink that is added dropwise to the surface of the aforementioned recording medium containing a multivalent metal salt, an organic cationic substance or an organic anionic substance is preferably $1.0 \times 10^2/\mu L$ or more, more preferably $5.0 \times 10^2/\mu L$ or more, further preferably $1.0 \times 10^3/\mu L$ or more.

When the number of particles having a particle diameter of 5 $\mu$m or larger contained in the ink that is added dropwise to the surface of the recording medium is less than $1.0 \times 10^2/\mu L$, the optical concentration and the bleeding are insufficient in some cases.

Measurement of the number of particles having a particle diameter of 5 $\mu$m or larger contained in the ink that is added dropwise to the surface of a recording medium containing a multivalent metal salt, an organic cationic substance or an organic anionic substance (hereinafter, these substances are abbreviated as "ink flocculant" in some cases) is performed by adding 0.1 ml of an ink dropwise to the surface of a recording medium containing an ink flocculant, collecting 2 $\mu$L of the ink present on the surface of the recording medium within five seconds after adding dropwise, and measuring the number using Accusizer ™770 Optical Particle Sizer (manufactured by Particle Sizing Systems).

At measurement, as a setting parameter to be inputted in the aforementioned measuring apparatus, a density of a pigment is used as a density of a particle to be dispersed in the aforementioned mixed solution. The density of a pigment can be obtained by measuring a powder obtained by heating and drying a pigment dispersion using a gravimeter or a pycnometer.

Alternatively, as the inkjet recording method of the invention, it is suitable to apply a liquid composition containing a multivalent metal salt, an organic cationic substance or an organic anionic substance to the surface of a recording medium and, thereafter, printing on a region of the surface of the recording medium to which the liquid composition has been applied, using the ink of the invention. As the multivalent metal salt, the organic cationic substance and the organic anionic substance contained in the liquid composition, substances similar to those (ink flocculant) contained in the surface of the above-explained recording medium can be used.

By printing with the ink of the invention after the liquid composition is applied to the recording medium in this way, it becomes possible to rapidly aggregate a coloring material such as a pigment and the like contained in the ink on the recording medium, and becomes possible to further improve the image quality such as the optical concentration, the bleeding and the like.

The number of particles having a particle diameter of 5 $\mu$m or larger contained in a mixed solution obtained by mixing the aforementioned liquid composition containing a multivalent metal salt, an organic cationic substance or an organic anionic substance, that is, an ink flocculant, with the ink of the invention is preferably $1.0 \times 10^3/\mu L$ or more, more preferably $5.0 \times 10^3/\mu L$ or more, further preferably $1.0 \times 10^4/\mu L$ or more.

When the number of particles having a particle diameter of 5 $\mu$m or larger contained in the ink added dropwise to the surface of the recording medium is less than $1.0 \times 10^3/\mu L$, the optical concentration and the bleeding are insufficient in some cases.

Measurement of the number of particles having a particle diameter of 5 $\mu$m or larger contained in a mixed solution obtained by mixing a liquid composition containing an ink flocculant and the ink of the invention, is performed by mixing an ink and a liquid composition at a ratio by mass of 1:1, collecting 2 $\mu$L of the mixed solution while stirring the solution and, thereafter, measuring the number within ten minutes from the mixing, using Accusizer ™770 Optical Particle Sizer (manufactured by Particle Sizing Systems). Other conditions such as setting of an apparatus at measurement and the like are the same as described above.

A liquid composition used in the inkjet recording method of the invention is not particularly limited as far as the composition contains an ink flocculant, but a surfactant may be added to the composition. As this surfactant, the same surfactants as those that can be added to the ink can be used.

The surface tension of the liquid composition is preferably at least 20 mN/m and less than 45 mN/m, more preferably at least 25 mN/m and less than 50 mN/m, further preferably at least 27.5 mN/m and less than 37.5 mN/m.

When the surface tension becomes less than 20 mN/m, the liquid composition permeates into the recording medium faster, and color unevenness due to a printing sequence, the optical concentration and the bleeding are deteriorated in some cases. Conversely, when the surface tension exceeds 40 mN/m, the liquid composition permeates into the recording medium slower, and unevenness in solid part concentration occurs in some cases.

The viscosity of the liquid composition is preferably at least 1.2 mPa·s and less than 6.0 mPa·s, more preferably at least 1.5 mPa·s and less than 4.5 mPa·s, further preferably at least 1.8 mPa·s and less than 4.0 mPa·s.

When the viscosity of the liquid composition is larger than 6.0 mPa·s, the discharging property from a nozzle is reduced, and the reliability is reduced in some cases.

On the other hand, when the viscosity of the liquid composition is less than 1.2 mPa·s, the sufficient optical concentration can not be obtained. It is contemplated that this is because the permeability of the liquid composition into a recording medium becomes great, and, as a result, a pigment permeates into the interior of the recording medium.

Then, the details of an ink flocculant contained on the surface of the recording medium or in the liquid composition, that is, a multivalent metal salt, an organic cationic substance and an organic anionic substance are explained.

Examples of the multivalent metal salt contained on the surface of the recording medium or the multivalent metal salt which can be added to the liquid composition include salts of multivalent metal ions such as aluminium ion, barium ion, calcium ion, copper ion, iron ion, magnesium ion, manganese ion, nickel ion, tin ion, titanium ion, zinc ion and the like, with hydrochloric acid, hydrobromic acid, hydriodic acid, sulfuric acid, nitric acid, phosphoric acid and thiocyanic acid, and organic carboxylic acids such as acetic acid, oxalic acid, lactic acid, fumaric acid, citric acid, salicylic acid, benzoic acid and the like, and organic sulfonic acids.

Specific examples include salts of multivalent metals such as aluminium chloride, aluminium bromide, aluminium sulfate, aluminium nitrate, sodium aluminium sulfate, potassium aluminium sulfate, aluminium acetate, barium chloride, barium bromide, barium iodide, barium oxide, barium nitrate, barium thiocyanate, calcium chloride, calcium bromide, calcium iodide, calcium nitrite, calcium nitrate, dihydrogencalcium phosphate, potassium thiocyante, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, dihydrogenmanganase phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, zinc acetate and the like.

Subsequently, examples of the organic cationic substance include primary, secondary, tertiary and quaternary amines and salt thereof. Specific examples include tetraalkylammonium salt, alkylamine salt, benzalkonium salt, alkylpyridium salt, imidazolium salt, polyamine and the like, for example, isopropylamine, isobutylamine, t-butylamine, 2-ethylhexylamine, nonylamine, dipropylamine, diethylamine, trimethylamine, triethylamine, dimethylpropylamine, ethylenediamine, propylenediamine, hexamethylenediamine, diethylenetriamine, tetraethylenepentamine, diethanolamine, diethylethanolaimne, triethanolamine, tetramethylammonium chloride, tetraethylammonium bromide, dihydroxyethylstearylamine, 2-heptadecenylhydroxyethylimidazoline, lauryldimethylbenzylammonium chloride, cetylpyridinium chloride, stearamidomethylpyridinium chloride, diallyldimethylammonium chloride polymer, diallylamine polymer, monoallylamine polymer and the like.

Preferable examples include aluminium sulfate, calcium chloride, calcium nitrate, calcium acetate, magnesium chloride, magnesium nitrate, magnesium sulfate, magnesium acetate, tin sulfate, zinc chloride, zinc nitrate, zinc sulfate, zinc acetate, aluminium nitrate, monoallylamine polymer, diallylamine polymer, diallyldimethylammonium chloride polymer and the like.

In addition, as the organic anionic substance, carboxylic acid, sulfonic acid and phosphoric acid can be used, and examples thereof include acetic acid, oxalic acid, lactic acid, fumaric acid, citric acid, salicylic acid, benzoic acid, benzenesulfonic acid, toluenesulfonic acid, hydroxybenzenesulfonic acid, and triphenyl phosphate and the like.

The inkjet recording method of the invention is not particularly limited as far as the method is the known inkjet system, but printing can be performed on the surface of a recording medium using a thermal inkjet system and a piezo-inkjet system.

In the inkjet recording method of the invention, an amount of a droplet (impartation amount) upon impartation of an ink to the surface of a recording medium is preferably 25 ng or less, more preferably 0.5 ng to 20 ng, further preferably 2.5 ng to 18 ng, per liquid droplet.

When an amount of a drop exceeds 25 ng per liquid droplet, the bleeding occurs to a high degree in some cases, and a drying time becomes long in some cases. This is contemplated as follows: For example, when a liquid composition having the function of aggregating ink is present on the surface of a recording medium, an ink is aggregated on a plane on which the ink and the recording medium are contacted, permeation of the ink is inhibited and, thereupon, when an amount of a droplet of an ink is large, the ink is spread in a paper surface direction.

From the viewpoint of the effect of improving the bleeding, it is more preferable to use a thermal inkjet system. Although what causes the advantage of a thermal inkjet system has not been made clear, it is contemplated as follows: When an ink is discharged from a nozzle, the viscosity of the heated ink becomes low, but since a temperature of the ink is lowered when imparted to the surface of a recording medium, the viscosity is dramatically increased. For this reason, it is contemplated that this system has the effect of improving the bleeding.

The ink and the inkjet recording method of the invention as explained above can be used in an inkjet recording apparatus with a heater for controlling drying of an ink mounted thereon, or in an inkjet recording apparatus which is provided with an intermediate transferring mechanism in which an ink is transferred onto a recording medium such as paper after printed on an intermediate body, as well as in a normal inkjet recording apparatus.

EXAMPLES

The present invention will be explained more specifically by way of Examples below. However, the invention is not limited by the following Examples.

(Ink)

Inks used in Examples are prepared utilizing the following pigment treating method 1, pigment treating method 2 or ink preparing method.

Pigment Treating Method 1

A pigment is subjected to surface oxidizing treatment with sodium hypochlorite, and subjected to desalting treatment. The thus obtained surface-treated pigment is added to ion-exchanged water so that the pigment concentration becomes 20% by mass, a pH is adjusted to 7.5, and dispersing is performed using an ultrasound homogenizer. This dispersion is subjected to centrifugation treatment (8000 rpm×30 min) with a centrifuging apparatus, to remove the residue part (20% by mass relative to a total amount).

Pigment Treating Method 2

3 Parts by mass of a Styren-Sodium acrylic acid copolymer and ion-exchanged water are added to 30 parts by mass of a pigment (Black Pearls L, manufactured by Cabot Corporation), making a total amount of 300 parts by mass. This mixed solution is dispersed with an ultrasound homogenizer, and this dispersion is subjected to centrifugation treatment (8000 rpm×30 min) with a centrifugation apparatus to remove 100 parts by mass of the residue part. Subsequently, filtration is performed using a 2 μm filter to obtain a desired pigment dispersion.

Ink Preparing Method

Appropriate amounts of a water-soluble organic solvent, a surfactant, ion-exchanged water and the like are added to an appropriate amount of the pigment dispersion, and an ink is prepared so that predetermined amounts of respective materials are contained. This is mixed, stirred and subjected to a 2 μm filter to obtain a desired ink.

<Ink-1>

According to the aforementioned ink preparing method, an ink containing the following composition (Ink-1) is prepared.

Cabojet-300 (manufactured by Cabot Corporation): 4% by mass
Diethylene glycol (SP=15.0): 8% by mass
Triethylene glycol (SP=13.6): 4% by mass
N-methyl-2-pyrrolidone (SP=10.8): 2% by mass
Urea: 5% by mass
Acetylene glycol ethylene oxide adduct: 1% by mass
Ion-exchanged water: 76% by mass The viscosity of the ink is 2.3 mPa·s, and the surface tension of the ink is 32 mN/m.

<Ink-2>

According to the aforementioned ink preparing method, an ink containing the following composition (Ink-2) is prepared.

IJX253 (Cabot Corporation): 5% by mass
n-Butyl methacrylate-metacrylic acid-sodium methacrylate copolymer: 0.15% by mass
Glycerin (SP=20.0): 10% by mass
Tripropylene glycol (SP=12.1): 5% by mass
Butylcarbitol (SP=10.5): 3% by mass
Urea: 4% by mass
Polyoxyethylene2-ethyl hexyl ether: 1% by mass
Ion-exchanged water: 71.85% by mass The viscosity of this ink is 2.8 mPa·s, and the surface tension of the ink is 33 mN/m.

<Ink-3>

According to the pigment treating method 1, a pigment is treated and, subsequently, according to the aforementioned ink preparing method, an ink containing the following composition (Ink-3) is prepared.

C.I. Pigment Red 122: 4% by mass
    Styrene-methacrylic acid-sodium methacrylate copolymer: 0.1% by mass
    Thiodiethanol (SP=15.2): 8% by mass
    Tetraethylene glycol (SP=12.8): 8% by mass
    Ethylene oxide adduct of propylene glycol (SP=10.9): 4% by mass
    Urea: 5% by mass
    Ethylene oxide adduct of acetylene glycol: 0.8% by mass
    Ion-exchanged water: 70.1% by mass The viscosity of this ink is 2.5 mPa·s, and the surface tension of the ink is 31 mN/m.

<Ink-4>

According to the pigment treating method 2, a pigment is treated and, subsequently, according to the aforementioned ink preparing method, an ink containing the following composition (Ink-4) is prepared.

Black Pearls L (manufactured by Cabot Corporation): 4% by mass
    Styren-Sodium acrylic acid copolymer: 0.4% by mass
    Diethylene glycol (SP=15.0): 10% by mass
    Triethylene glycol (SP=13.6): 5% by mass
    Ethylene oxide adduct of diglycerin (SP=11.6): 3.5% by mass
    Urea: 6% by mass
    Ethylene oxide adduct of acetylene glycol: 0.25% by mass
    Ion-exchanged water: 70.85% by mass The viscosity of this ink is 2.5 mPa·s, and the surface tension of the ink is 31 mN/m.

<Ink-5>

According to the pigment treating method 1, a pigment is treated and, subsequently, according to the aforementioned ink preparing method, an ink containing the following composition (Ink-5) is prepared.

C.I. Pigment Red 122: 4% by mass
    Diethylene glycol (SP=15.0): 15% by mass
    N-methyl-2-pyrrolidone (SP=10.8): 5% by mass
    Urea: 5% by mass
    Ethylene oxide adduct of acetylene glycol: 1% by mass
    Ion-exchanged water: 70% by mass The viscosity of this ink is 2.2 mPa·s, and the surface tension of the ink is 32 mN/m.

<Ink-6>

According to the pigment treating method 1, a pigment is treated and, subsequently, according to the aforementioned ink preparing method, an ink containing the following composition (Ink-6) is prepared.

C.I. Pigment Red 122: 4% by mass
    Diethylene glycol (SP=15.0): 4% by mass
    Triethylene glycol (SP=13.6): 8% by mass
    N-methyl-2-pyrrolidone (SP=10.8): 4% by mass
    Urea: 5% by mass
    Ethylene oxide adduct of acetylene glycol: 1% by mass
    Ion-exchanged water: 74% by mass The viscosity of this ink is 2.5 mPa·s, and the surface tension of the ink is 32 mN/m.

<Ink-7>

According to the pigment treating method 1, a pigment is treated and, subsequently, according to the aforementioned ink preparing method, an ink containing the following composition (Ink-7) is prepared.

C.I. Pigment Red 122: 4% by mass
    Diethylene glycol (SP=15.0): 8% by mass
    Triethylene glycol (SP=13.6): 4% by mass
    N-methyl-2-pyrrolidone (SP=10.8): 0.5% by mass
    Urea: 5% by mass
    Ethylene oxide adduct of acetylene glycol: 1% by mass
    Ion-exchanged water: 77.5% by mass The viscosity of this ink is 2.1 mPa·s, and the surface tension of the ink is 32 mN/m.

<Ink-8>

According to the pigment treating method 1, a pigment is treated and, subsequently, according to the aforementioned ink preparing method, an ink containing the following composition (Ink-8) is prepared.

Black Pearls L (manufactured by Cabot Corporation): 4% by mass
    Diethylene glycol (SP=15.0): 8% by mass
    Triethylene glycol (SP=13.6): 4% by mass
    N-methyl-2-pyrrolidone (SP=10.8): 3.2% by mass
    Urea: 5% by mass
    Acetylene glycol ethylene oxide adduct: 1% by mass
    Ion-exchanged water: 74.8% by mass The viscosity of this ink is 2.2 mPa·s, and the surface tension of the ink is 32 mN/m.

<Ink-9>

According to the pigment treating method 2, a pigment is treated and, subsequently, according to the aforementioned ink preparing method, an ink containing the following composition (Ink-9) is prepared.

Black Pearls L (manufactured by Cabot Corporation): 4% by mass
    Styren-Sodium acrylic acid copolymer: 0.4% by mass
    Diethylene glycol (SP=15.0): 8% by mass
    Ethylene glycol (SP=17.8): 2% by mass
    Triethylene glycol (SP=13.6): 3.5% by mass
    Tetraethylene glycol (SP=12.8): 0.5% by mass
    1,2-Hexanediol (SP=13.4): 1% by mass Ethylene oxide adduct of diglycerine (SP=11.6): 1% by mass Butylcarbitol (SP=10.5): 0.5% by mass
    Urea: 6% by mass
    Ethylene oxide adduct of acetylene glycol: 0.25% by mass
    Ion-exchanged water: 72.85% by mass The viscosity of this ink is 2.3 mPa·s, and the surface tension of the ink is 31 mN/m. A solubility parameter $SP_1$ of a first water-soluble solvent group contained in the ink obtained by the already described equation (3) is 13.5.

<Ink-10>

According to the pigment treating method 1, a pigment is treated and, subsequently, according to the aforementioned ink preparing method, an ink containing the following composition (Ink-10) is prepared.

Black Pearls L (manufactured by Cabot Corporation): 4% by mass
    Diethylene glycol (SP=15.0): 8% by mass
    Triethylene glycol (SP=13.6): 4% by mass
    N-methyl-2-pyrrolidone (SP=10.8): 0.8% by mass
    Urea: 5% by mass
    Ethylene oxide adduct of acetylene glycol: 1% by mass
    Ion-exchanged water: 77.2% by mass The viscosity of this ink is 2.2 mPa·s, and the surface tension of the ink is 32 mN/m.

<Ink-11>

According to the pigment treating method 1, a pigment is treated and, subsequently, according to the aforementioned ink preparing method, an ink containing the following composition (Ink-11) is prepared.

Black Pearls L (manufactured by Cabot Corporation): 4% by mass
Diethylene glycol (SP=15.0): 3.6% by mass
Triethylene glycol (SP=13.6): 4% by mass
N-methyl-2-pyrrolidone (SP=10.8): 2% by mass
Urea: 5% by mass
Ethylene oxide adduct of acetylene glycol: 1% by mass
Ion-exchanged water: 80.4% by mass The viscosity of this ink is 2.0 mPa·s, and the surface tension of the ink is 31 mN/m.

R.H), and assessment was performed on samples which has been allowed to stand under the general environment for 24 hours after printing.

Regarding Examples 1 to 5 using Ink-1 to 4, and 9, and Comparative Examples 1 to 6 using Ink-5 to 8, 10, and 11, assessment of the ink alone is performed. The results are shown in Table 1.

On the other hand, regarding Examples 6 and 7 using Ink-2 and 3 and TL1 in combination, a liquid composition is imparted to a recording medium, then, the ink is imparted. Assessment is performed using such recording method. The results are shown in Table 2.

TABLE 1

| | Ink | $SP_2 - SP_1$ | $SP_1 - SP_3$ | $W_2/W_1$ | $W_3/W_1$ | ζ potential (mV) | η (mPa's) | γ (mN/m) | Long-term ejection stability | Long-term storage stability | Optical concentration | Bleeding | Water resistance |
|---|---|---|---|---|---|---|---|---|---|---|---|---|---|
| Example 1 | Ink-1 | 1.4 | 2.8 | 2 | 0.5 | −32 | 2.3 | 32 | ○ | ○ | ○ | ○ | ○ |
| Example 2 | Ink-2 | 7.9 | 1.6 | 2 | 0.6 | −50 | 2.8 | 33 | ○ | ○ | ○ | ○ | Δ |
| Example 3 | Ink-3 | 2.4 | 1.9 | 1 | 0.5 | −11 | 2.5 | 31 | ○ | ○ | ○ | ○ | ○ |
| Example 4 | Ink-4 | 1.4 | 2.0 | 2 | 0.7 | −44 | 2.5 | 31 | ○ | ○ | ○ | ○ | ○ |
| Example 5 | Ink-9 | 1.4 | 2.0 | 2 | 0.3 | −38 | 2.3 | 31 | ○ | ○ | ○ | ○ | ○ |
| Comparative Example 1 | Ink-5 | — | — | — | — | −15 | 2.2 | 32 | X | ○ | ○ | ○ | ○ |
| Comparative Example 2 | Ink-6 | 1.4 | 2.8 | 0.5 | 0.5 | −11 | 2.5 | 32 | X | X | ○ | ○ | ○ |
| Comparative Example 3 | Ink-7 | 1.4 | 2.8 | 2 | 0.125 | −9 | 2.1 | 32 | ○ | X | ○ | ○ | ○ |
| Comparative Example 4 | Ink-8 | 1.4 | 2.8 | 2 | 0.8 | −63 | 2.2 | 32 | X | ○ | X | X | X |
| Comparative Example 5 | Ink-10 | 1.4 | 2.8 | 2 | 0.2 | −65 | 2.2 | 32 | ○ | X | X | X | X |
| Comparative Example 6 | Ink-11 | 1.4 | 2.8 | 0.9 | 0.5 | −66 | 2.0 | 31 | ○ | X | X | X | X |

TABLE 2

| | Ink and liquid composition | $SP_2 - SP_1$ | $SP_1 - SP_3$ | $W_2/W_1$ | $W_3/W_1$ | ζ potential (mV) | η (mPa's) | γ (mN/m) | Long-term ejection stability | Long-term storage stability | Optical concentration | Bleeding | Water resistance |
|---|---|---|---|---|---|---|---|---|---|---|---|---|---|
| Example 6 | Ink-2 | 7.9 | 1.6 | 2 | 0.6 | −50 | 2.8 | 33 | ○ | ○ | ○ | ○ | ○ |
| | TL-1 | — | — | — | — | — | 2.1 | 31 | | | | | |
| Example 7 | Ink-3 | 2.4 | 1.9 | 1 | 0.5 | −11 | 2.5 | 31 | ○ | ○ | ○ | ○ | ○ |
| | TL-1 | — | — | — | — | — | 2.1 | 31 | | | | | |

<TL1>

A liquid composition (TL-1) is obtained by mixing the following composition.

Diethylene glycol: 20% by mass
Magnesium nitrate: 5% by mass
Urea: 5% by mass
Polyoxyethylene stearyl ether (the number of repeating units of ethylene oxide=12): 0.1% by mass
Water: 69.9% by mass The viscosity of this liquid composition is 2.1 mPa·s and the surface tension is 31 mN/m.

(Assessment Method)

Printing is performed only with ink, or with ink and a liquid composition, on a FX-P paper (manufactured by Fuji Xerox Co., Ltd.) using a 800 dpi trial printing head with 256 nozzles, and various assessments are performed. Unless specified otherwise, printing is performed under the general environment (temperature: 23±0.5° C., humidity: 55±5%

In Table 1 and Table 2, "$SP_2$" means a solubility parameter of a second water-soluble solvent group (when two or more kinds of water-soluble solvents are contained, a value of a water-soluble solvent having the lowest solubility parameter), "$SP_3$" means a solubility parameter of a third water-soluble solvent group (when two or more kinds of water-soluble solvents are contained, a value of a water-soluble solvent having the highest solubility parameter), "η" means the viscosity and "λ" means the surface tension. In addition, an assessing method and assessment criteria of various assessment items (long-term ejection stability, long-term storage stability, optical concentration, bleeding and water resistance) shown in the above Table 1 and Table 2 are as explained below.

<Long Term Ejection Stability>

An ink is continuously printed at $5 \times 10^7$ pulse, and Drop speeds are measured before and after printing. A rate of Drop speeds before and after continuous printing (ΔDS value (%))

is calculated according to the following equation (5), and assessment is performed based on the following assessment criteria.

$$\Delta DS = 100 \times (\text{Drop speed after continuous printing} \div \text{Drop speed before continuous printing}) \quad \text{Equation (5)}$$

Assessment Criteria
○ . . . ΔDS is 90% or more.
Δ . . . ΔDS is 80% or more.
× . . . ΔDS is less than 80%.

<Long-Term Storage Stability>

Ink is allowed to stand at a temperature of 60° C. for 1000 hours, and the number of particles having a particle diameter of 0.5 μm or larger contained in an ink before and after standing is measured. Then, a ratio of the numbers of particles before and after standing (ΔPS value (%)) is calculated according to the following equation (6) and assessment is performed based on the following assessment criteria.

Measurement of the number of particles having a particle diameter of 0.5 μm or larger is performed using Accusizer ™770 Optical Particle Sizer (manufactured by Particle Sizing Systems) by the same measuring method as that described above.

$$\Delta PS = 100 \times (\text{the number of particles having a particle diameter of 0.5 μm or larger contained in the ink after standing} \div \text{the number of particles having a particle diameter of 0.5 μm or larger contained in an ink before standing}) \quad \text{Equation 6}$$

Assessment Criteria
○ . . . ΔPS is less than 110%.
Δ . . . ΔPS is less than 150%.
× . . . ΔPS is 150% or more.

<Optical Concentration>

A 100% coverage pattern is printed, the optical concentration is measured using X-rite 404 (manufactured by X-rite Incorporated.), and ranking is performed based on the following assessment criteria.

Assessment Criteria (in the Case of Using Black Ink)
○ . . . Optical concentration is at least 1.4.
Δ . . . Optical concentration is at least 1.3 and less than 1.4.
× . . . Optical concentration is less than 1.3.

Assessment Criteria (in the Case of Using Color Ink)
○ . . . Optical concentration is at least 1.1.
Δ . . . Optical concentration is at least 1.0 and less than 1.1.
× . . . Optical concentration is less than 1.0.

<Bleeding>

A fine line pattern was printed, an extent of the bleeding of a printed part is compared with a boundary sample, and sensory assessment is performed according to the following assessment criteria.

Assessment Criteria
○ . . . Slight bleeding.
Δ . . . Bleeding occured at an acceptable level.
× . . . Bleeding was severe and is outside an acceptable range.

<Water Resistance>

A sample on which a solid pattern has been printed is immersed in water for 5 minutes, and assessment is performed using the following assessment criteria based on the rate of the optical concentrations before and after immersion (ΔOD value (%) calculated according to the following equation (7).

$$\Delta OD \text{ value} = 100 \times (\text{optical concentration after immersion} \div \text{optical concentration before immersion}) \quad \text{Equation (7)}$$

Assessment Criteria
○ . . . ΔOD value is at least 90%.
Δ . . . ΔOD value is at least 80%.
× . . . ΔOD value is less than 80%.

As explained above, the inkjet ink and the inkjet recording method recited in the invention are excellent in the long-term ejection stability, the long-term storage stability, the optical concentration, the bleeding and the water resistance.

What is claimed is:

1. An inkjet ink comprising a pigment, a water-soluble solvent and water, the water-soluble solvent comprising:
a first water-soluble solvent group comprising a water-soluble solvent represented by the following general formula (I) and having a solubility parameter $SP_1$;
a second water-soluble solvent group comprising a water-soluble solvent having a solubility parameter which is at least 1 greater than the solubility parameter $SP_1$ and;
a third water-soluble solvent group comprising a water-soluble solvent having a solubility parameter which is at least 1 less than the solubility parameter $SP_1$;
wherein respective contents (% by mass) of the water-soluble solvent groups contained in the inkjet ink satisfy the following equation (1) and the following equation (2):

$$\text{HO}-(\text{CHR}-\text{CH}_2-\text{O}-)_n-\text{H} \quad \text{General formula (I)}$$

$$W_2/W_1 \geq 1.5 \quad \text{Equation (1)}$$

$$0.25 \leq W_3/W_1 \leq 0.75 \quad \text{Equation (2)}$$

wherein in general formula (I), equation (1) and equation (2), n represents an integer of 3 to 6; R represents hydrogen or a methyl group; $W_1$ represents a content (% by mass) of the first water-soluble solvent group contained in the inkjet ink; $W_2$ represents a content (% by mass) of the second water-soluble solvent group contained in the inkjet ink; and $W_3$ represents a content (% by mass) of the third water-soluble solvent group contained in the inkjet ink.

2. The inkjet ink of claim 1, wherein the first water-soluble organic solvent group further comprises a water-soluble solvent other than the water-soluble solvent represented by general formula (I), having a solubility parameter such that an absolute value of a difference thereof from the solubility parameter $SP_1$ is less than 1.

3. The inkjet ink of claim 1, wherein the pigment is self-dispersible in water.

4. The inkjet ink of claim 3, further comprising a polymer anion or a polymer cation.

5. The inkjet ink of claim 1, further comprising a polymer dispersant, wherein the pigment is dispersed by the polymer dispersant.

6. The inkjet ink of claim 1, wherein an absolute value of a ζ potential of the inkjet ink is in the range of 3 mV to 60 mV.

7. The inkjet ink of claim 1, wherein the surface tension of the inkjet ink is at least 20 Nm/m and less than 45 mN/m.

8. The inkjet ink according to claim 1, wherein the viscosity of the inkjet ink is at least 1.2 mPa·s and less than 6.0 mPa·s.

9. The inkjet ink of claim 1, wherein the water-soluble solvent represented by the general formula (I) is selected from a group consisting of tetraethylene glycol, pentaethylene glycol, hexaethylene glycol, and tripropylene glycol.

10. An inkjet recording method of printing on a recording medium, the recording medium comprising a multivalent metal salt, an organic cationic substance or an organic anionic substance, using an inkjet ink comprising a pigment, a water-soluble solvent and water, wherein:
the water-soluble solvent comprises,
a first water-soluble solvent group comprising a water-soluble solvent represented by the following general formula (I) and having a solubility parameter $SP_1$,
a second water-soluble solvent group comprising a water-soluble solvent having a solubility parameter which is at least 1 greater than a solubility parameter $SP_1$, and
a third water-soluble solvent group comprising a water-soluble solvent having a solubility parameter which is at least 1 less than the solubility parameter $SP_1$; and
wherein respective contents (% by mass) of the water-soluble solvent groups contained in the inkjet ink satisfy the following equation (1) and the following equation (2):

$$HO-(CHR-CH_2-O-)_n-H \qquad \text{General formula (I)}$$

$$W_2/W_1 \geq 1.5 \qquad \text{Equation (1)}$$

$$0.25 \leq W_3/W_1 \leq 0.75 \qquad \text{Equation (2)}$$

wherein in general formula (I), equation (1) and equation (2), n represents an integer of 3 to 6; R represents hydrogen or a methyl group; $W_1$ represents a content (% by mass) of the first water-soluble solvent group contained in the inkjet ink; $W_2$ represents a content (% by mass) of the second water-soluble solvent group contained in the inkjet ink; and $W_3$ represents a content (% by mass) of the third water-soluble solvent group contained in the inkjet ink.

11. The inkjet recording method of claim 10, wherein the first water-soluble organic solvent group further comprises a water-soluble solvent other than the water-soluble solvent represented by the general formula (I), having a solubility parameter such that an absolute value of a difference thereof from the solubility parameter $SP_1$ is less than 1.

12. The inkjet recording method of claim 10, wherein the number of particles having particle diameters of 5 μm or larger contained in the inkjet ink is $1 \times 10^2/\mu l$ or more, and wherein the inkjet ink is added dropwise to a surface of the recording medium.

13. The inkjet recording method of claim 10, wherein the water-soluble solvent represented by the general formula (I) is selected from a group consisting of tetraethylene glycol, pentaethylene glycol, hexaethylene glycol, and tripropylene glycol.

14. An inkjet recording method, wherein a liquid composition comprising a multivalent metal salt, an organic cationic substance or an organic anionic substance is imparted to a surface of a recording medium and, thereafter, printing is conducted on a region of the surface of the recording medium to which the liquid composition has been imparted, using an inkjet ink comprising a pigment, a water-soluble solvent and water, wherein:
the water-soluble solvent comprises
a first water-soluble solvent group comprising a water-soluble solvent represented by the following general formula (I) and having a solubility parameter $SP_1$;
a second water-soluble solvent group comprising a water-soluble solvent having a solubility parameter which is at least 1 greater than a solubility parameter $SP_1$ and;
a third water-soluble solvent group comprising a water-soluble solvent having a solubility parameter which is at least 1 less than the solubility parameter $SP_1$; and
wherein respective contents (% by mass) of the water-soluble solvent groups contained in the inkjet ink satisfy the following equation (1) and the following equation (2):

$$HO-(CHR-CH_2-O-)_n-H \qquad \text{General formula (I)}$$

$$W_2/W_1 \geq 1.5 \qquad \text{Equation (1)}$$

$$0.25 \leq W_3/W_1 \leq 0.75 \qquad \text{Equation (2)}$$

wherein in general formula (I), equation (1) and equation (2), n represents an integer of 3 to 6; R represents hydrogen or a methyl group; $W_1$ represents a content (% by mass) of the first water-soluble solvent group contained in the inkjet ink; $W_2$ represents a content (% by mass) of the second water-soluble solvent group contained in the inkjet ink; and $W_3$ represent a content (% by mass) of the third water-soluble solvent group contained in the inkjet ink.

15. The inkjet recording method of claim 14, wherein the first water-soluble organic solvent group further comprises a water-soluble solvent other than the water-soluble solvent represented by the general formula (I), having a solubility parameter such that an absolute value of a difference thereof from the solubility parameter $SP_1$ is less than 1.

16. The inkjet recording method of claim 14, wherein the number of particles having particle diameters of 5 μm or larger in a mixed solution of the inkjet ink and the liquid composition is $1.0 \times 10^3/\mu l$ or more.

17. The inkjet recording method of claim 14, wherein the water-soluble solvent represented by the general formula (I) is selected from a group consisting of tetraethylene glycol, pentaethylene glycol, hexaethylene glycol, and tripropylene glycol.

18. An inkjet recording method of printing on a recording medium by a thermal inkjet system or a piezo-inkjet system using an inkjet ink comprising a pigment, a water-soluble solvent and water, wherein:
the water-soluble solvent comprises
a first water-soluble solvent group comprising a water-soluble solvent represented by the following general formula (I) and having a solubility parameter $SP_1$,
a second water-soluble solvent group comprising a water-soluble solvent having a solubility parameter which is at least 1 greater than a solubility parameter $SP_1$, and
a third water-soluble solvent group comprising a water-soluble solvent having a solubility parameter which is at least 1 less than the solubility parameter $SP_1$; and
wherein respective contents (% by mass) of the water-soluble solvent groups contained in the inkjet ink satisfy the following equation (1) and the following equation (2):

$$HO-(CHR-CH_2-O-)_n-H \qquad \text{General formula (I)}$$

$$W_2/W_1 \geq 1.5 \qquad \text{Equation (1)}$$

$$0.25 \leq W_3/W_1 \leq 0.75 \qquad \text{Equation (2)}$$

wherein in general formula (I), equation (1) and equation (2), n represents an integer of 3 to 6; R represents hydrogen or a methyl group; $W_1$ represents a content (% by mass) of the first water-soluble solvent group contained in the inkjet ink; $W_2$ represents a content (% by mass) of the second water-soluble solvent group contained in the inkjet ink; and $W_3$ represents a content (% by mass) of the third water-soluble solvent group contained in the inkjet ink.

19. The inkjet recording method of claim 18, wherein the first water-soluble organic solvent group comprises a water-soluble solvent other than the at least one kind of water-soluble solvent represented by general formula (I), having a solubility parameter such that an absolute value of a difference thereof from the solubility parameter $SP_1$ is less than 1.

20. The inkjet recording method of claim 18, wherein the amount of the inkjet ink to be imparted to a surface of the recording medium is 25 ng or less per one droplet.

21. The inkjet recording method of claim 18, wherein the water-soluble solvent represented by the general formula (I) is selected from a group consisting of tetraethylene glycol, pentaethylene glycol, hexaethylene glycol, and tripropylene glycol.

* * * * *